United States Patent [19]

Tokumo et al.

[11] Patent Number: 4,824,696
[45] Date of Patent: Apr. 25, 1989

[54] PRODUCTION PROCESS AND ADHESIVES FOR CORRUGATED BOARD

[75] Inventors: Masateru Tokumo, Nishinomiya; Kinichi Shirakawa, Takatsuki; Takatoshi Koyakumaru, Kyoto; Takuji Okaya, Nagaokakyo; Hiroyuki Onishi, Kurashiki; Hiroji Kohno, Kawanishi, all of Japan

[73] Assignees: Kuraray Co., Ldt.; Rengo Co., Ltd., both of Japan

[21] Appl. No.: 793,107

[22] Filed: Oct. 30, 1985

[30] Foreign Application Priority Data

Oct. 31, 1984 [JP]  Japan .................................. 59-230793

[51] Int. Cl.$^4$ .............................................. B05D 5/10
[52] U.S. Cl. ................................. 427/208.6; 156/291; 156/327; 427/207.1; 427/208.4; 427/391
[58] Field of Search .................... 156/291, 327; 427/207.1, 208.4, 208.6; 493/110

[56] References Cited

U.S. PATENT DOCUMENTS

3,135,648  6/1964  Hawkins ........................... 524/405
3,668,166  6/1972  Kane et al. ....................... 524/405
4,442,252  4/1984  Sumi et al. ....................... 524/183

OTHER PUBLICATIONS

"Preparation of Corrugating Adhesives", Kroeschell, Ed., Tappi Press, 1977.
"Corrugated Fibreboard Boxes", pp. 11-13, Australian Paper Manufacturers Ltd.
"Uniform Freight Classification 9", Rule 41, Section 3, p. 454.

*Primary Examiner*—Joseph L. Schofer
*Assistant Examiner*—J. M. Reddick
*Attorney, Agent, or Firm*—Wegner & Bretschneider

[57] ABSTRACT

A process for production of corrugated board using an aqueous adhesive which contains polyvinyl alcohol and clay, or polyvinyl alcohol, clay and water-soluble boron compound, the ratio of clay to polyvinyl alcohol being in the range of 200 to 600 parts by weight based on 100 parts by weight of polyvinyl alcohol, the ratio of water-soluble boron compound being not more than 15 parts by weight based on 100 parts by weight of polyvinyl alcohol, the solid content of the adhesive being 25 to 60% by weight characterized in that (a) a polyvinyl alcohol concentration in the solution excluding solid other than polyvinyl alcohol from adhesive being in the region bounded by the following formulas:

$$Y \geq -0.0014\,X + 9.4 \qquad \text{(I)}$$

$$Y \leq -0.0061\,X + 26.3 \qquad \text{(II)}$$

$$200 \leq X \leq 3500 \qquad \text{(iii)}$$

wherein Y is defined by the following formula:

$$Y = \frac{P}{P + W} \times 100 \ (\%\ \text{by weight})$$

P = Polyvinyl alcohol content in the adhesive (by weight)
W = Water content in the adhesive (by weight)
and X is degree of polymerization of polyvinyl alcohol, (b) the viscosity of the adhesive measured by a Brookfield viscometer being from 200 to 6000 centipoises at 85° C., and the rate of increase of the viscosity of the adhesive being in the range of 1.5 to 8 times when the temperature of adhesive is dropped from 85° to 30° C., (c) the adhesive, of which temperature is 60° to 95° C., being applied onto the flute tips of corrugated medium to manufacture corrugated board, and an aqueous adhesive therefor. The process for production of a corrugated board has excellent effect on heat energy saving characterized in that said corrugated board can be manufactured at high speed without heating after application of the water-base adhesive at a temperature of 60°-95° C., and the adhesive is easy to handle and has improved adhesion property.

10 Claims, 2 Drawing Sheets

PRODUCTION PROCESS AND ADHESIVES FOR CORRUGATED BOARD

FIELD OF THE INVENTION

The present invention relates to a heat energy saving and high speed production process for corrugated board, and to adhesives used for said process. More particularly, the present invention relates to a process of manufacturing corrugated board having an excellent effect on heat energy saving, characterized in that said corrugated board can be manufactured at high production speed without heating after application of a water-based adhesive having a temperature of 60°–95° C., said adhesive containing polyvinyl alcohol and clay, or polyvinyl alcohol, clay and a water-soluble boron compound, and being easy to handle and having improved adhesion.

BACKGROUND OF THE INVENTION

The manufacture of corrugated board essentially is to combine sheet linerboards with a corrugated medium by means of adhesives. However, too much heat energy is consumed in this operation because water-base starch glue, for which gelatin and concentration are carried out only through heating and drying, is used an adhesive.

In the manufacture of corrugated board, single-faced board is first made on a single facer.

That is, fed sheet medium is corrugated while starch adhesive is applied onto the tips of the flutes of said corrugated medium with an applicator roll, and sheet linerboard is bonded, by means of heat and pressure, on said medium to which starch adhesive has been applied.

Then, the single-faced board manufactured on said single facer is transported to a glue machine, wherein starch adhesive is applied onto the flute tips of said single-faced board, and is fed to between the canvas and the heat tables heated to about 170° C. of a double facer. After said single-faced board is combined with fed double-faced linerboard for single-wall corrugated board, or fed double-faced linerboard and another single-faced board for double-wall corrugated board, weight rolls firmly press the combined board to canvas-covered heat tables to gelatinize and dry the adhesive. Thereafter, the resulting single-wall board or double-wall board is slit and scored on a slitter scorer, is cut into a given length on a rotary cutoff, and is converted into single-wall corrugated blanks or double-wall corrugated blanks.

The adhesion on the double facer is carried out by heating starch adhesive applied onto the flute tips of the single-faced board through double-faced linerboard for single-wall board or through double-faced linerboard and another single-faced board for double-wall board.

Further, since single-faced board having formed flutes is combined with double-faced linerboard on the double facer, high pressure can not be loaded on the combined board because of possible flute damage. These cause heat transfer efficiency at the heating tables to be extremely low. Therefore, much heat energy consumption in the double facer results in a severe problem.

In order to overcome the above defect, production processes for corrugated board which employ adhesives requiring no heating have been studied these past years (See Japanese Patent Laid Open Publication Nos. 32570/1981, 70074/1981 and 105952/1981). Furthermore, various studies have been carried out for polyvinyl alcohol type adhesives for paper (See Japanese Patent Publication No. 22579/1961, Japanese Patent Laid Open Publication No. 3336/1972 and U.S. Pat. No. 3,135,648 etc.).

However, as disclosed in the above-mentioned Japanese Patent Laid Open Publication Nos. 32570/1981 and 70074/1981, the so-called adhesives which can be applied to paper at a high temperature but which gelatinize upon cooling are those which use a property that the adhesive applied at a high temperature shows increasing viscosity and hardening upon cooling. Therefore, at low speed, there is a defect in that the adhesive applied onto the corrugated medium is hardened before being combined with linerboard, and that adhesion cannot be carried out.

Some set-back type starch adhesives containing a high content of amylose have an excellent setting property, but these adhesives have a defect that once adhesive is hardened upon cooling, it can not become fluid even if it is heated again. Then, such adhesives have a great problem in machinabilities such as conveying through pipes, applying, storing and the like, and can not be used in practical application.

On the other hand, Japanese Patent Laid Open Publication No. 105952/1981 discloses a method wherein adhesive is applied either onto corrugating medium or linerboard, and gelatinizing agents are coated onto the other. Thereafter, contact is carried out each other and adhesion is made by the reaction of the adhesive and the gelatinizing agents. However, this method has a defect that a process is complicated.

Polyvinyl alcohol type adhesives disclosed in Japanese Patent Publication No. 22579/1961, Japanese Patent Laid Open Publication No. 3336/1972 and U.S. Pat. No. 3,135,648 are insufficient in green bond, and manufacturing corrugated board at high speed could not be attained by the method which does not need heating at heat tables after application of adhesive.

Also, heat energy saving could not be accomplished.

OBJECT OF THE INVENTION

Recently, corrugated board production is generally made at the rate of 100 m/min or more. Further, from the view of productivity, corrugated board is slit and scored on a slitter scorer and cut lengthwise on a rotary cutoff direct after a double facer.

This means that high stress operates at an earlier stage of adhesion. Therefore, high initial setting ability and high green bond strength are required as characteristics of adhesives.

Thus, the development of adhesives for corrugated board is very difficult.

When production speed is over 100 m/min, the period of time between adhesive application on a glue machine and slitting/scoring on a slitter scorer is only 4 10 seconds. Therefore, in such a short period of time, green bond strength which can stand a stress from a slitter scorer or a rotary cutoff is required.

In this point, adhesives for corrugated board are different from those for laminated paperboard, paper tube and so on. Furthermore, it is required that application amount of adhesive is controlled under the remarkably high shear rate and then an adhesive has remarkably excellent fluidity. On the other hand, the production speed of corrugater is changed frequently and combining is often carried out at low production speed because an operation for paper change and/or order change is often carried out.

That is, on high production speed, it is required that an adhesive has a remarkably high setting ability and green bond. On low production speed, adhesive is required having a long open-time because it takes a long time from application of adhesive at the glue machine to entering into canvas-covered tables. Thus, there has not been developed a process of manufacturing corrugated board having an excellent effect on heat energy saving characterized in that said corrugated board can be manufactured at high speed without heating after application of water-base adhesive.

SUMMARY OF THE INVENTION

The present inventors have intensively studied an improved process for production of corrugated board. As the result, it has been found out that by using the adhesive containing a specific polyvinyl alcohol and by applicating the adhesive, of which temperature is 60° to 95° C., onto the flute tips of corrugated medium and combining, corrugated board can be manufactured from low production speed throughout high production speed without heating after application of adhesive.

The present invention provides a process for production of a corrugated board by using a water-base adhesive which consists essentially of polyvinyl alcohol (hereinafter, referred to "PVA") and clay, the ratio of the clay to the PVA being in the range of 200 to 600 parts by weight (hereinafter, referred to "parts"), based on 100 parts by weight of PVA, the solid content of the adhesive being in the range of 25 to 60% by weight (hereinafter, referred to "%") characterized in that (a) a polyvinyl alcohol concentration in the solution excluding solid other than polyvinyl alcohol from adhesive being in the region bounded by the following formulas:

$$Y \geq -0.0014 X + 9.4 \quad \text{(i)}$$

$$Y \leq -0.0061 X + 26.3 \quad \text{(ii)}$$

$$200 \leq X \leq 3500 \quad \text{(iii)}$$

wherein Y is defined by the following formula:

$$Y = \frac{P}{P + W} \times 100 \ (\% \text{ by weight})$$

P=Polyvinyl alcohol content in the adhesive (by weight)
W=Water content in the adhesive (by weight).
and X is degree of polymerization of polyvinyl alcohol, (b) the viscosity of the adhesive by a Brookfield viscometer being from 200 to 6000 centipoises at 85° C., and the rate of increase of the viscosity of the adhesive being in the range of 1.5 to 8 times when the temperature of adhesive is dropped from 85° to 30° C., (c) the adhesive, of which temperature is 60° to 95° C., being applied onto the flute tips of corrugated medium to manufacture corrugated board, whereby the corrugated board can be satisfactorily produced in a high production speed without heating after application of the adhesive.

$$Y = \frac{P}{P + W} \times 100 \ (\% \text{ by weight})$$

P=Polyvinyl alcohol content in the adhesive (by weight)
W=Water content in the adhesive (by weight).

Figure 2:
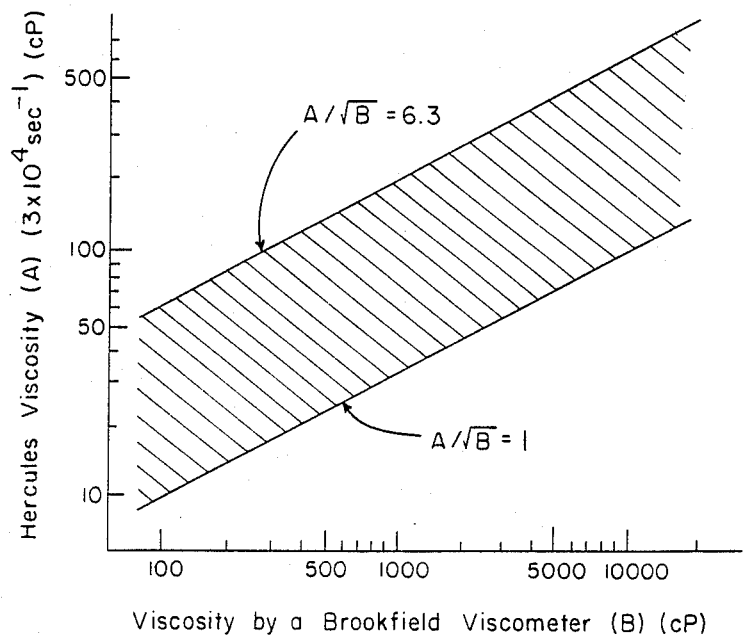

FIG. 2 shows the relationship between a Hercules viscosity at 60°–95° C. under the shear rate of $3 \times 10^4$ sec$^{-1}$ and the viscosity measured by a Brookfield viscometer, wherein A represents Hercules viscosity and B represents the viscosity measured by a Brookfield viscometer.

DETAILED DESCRIPTION OF THE INVENTION

According to the present invention, when an amount of clay is less than 200 parts to 100 parts of PVA, green bond and initial setting ability are extremely bad. On the other hand, if it exceeds 600 parts, it is inappropriate because it induces excessively less final adhesion strength and high solid content of the adhesive to give excessively high adhesive viscosity. Therefore, it is preferably in the range of 200 to 600 parts based on 100 parts of PVA, more preferably 200 to 450 parts.

The solid content of the water-base adhesive is preferably in the range of 25 to 60%. When the solid content of the adhesive is less than 25%, the green bond is too weak. On the other hand, if it exceeds 60%, handling on a corrugator is bad and final adhesion strength is too weak.

Further, the viscosity of adhesive also affects adhesion. It is preferable that the viscosity of the adhesive at 85° C. by a Brookfield viscometer is in the range of 200 to 6000 centipoises, more preferably 300 to 3000 centipoises.

Furthermore, it is more preferable that the viscosity of applied adhesive, of which temperature is 60 to 95° C., is in the range of 300 to 4000 centipoises. The higher the viscosity, the better its green bond is, but final adhesion strength becomes worse. On the other hand, the lower the viscosity is, the higher final adhesion strength is, but its green bond is insufficient.

It is desirable that the degree of polymerization of PVA used in the present invention is in the range of 200 to 3500. When the degree of polymerization is less than 200, final adhesion strength is extremely low. On the other hand, when the degree of polymerization is greater than 3500, final adhesion strength becomes lower too, because the viscosity of PVA solution itself is much higher and PVA can not be incorporated into the adhesive in a high content to satisfy initial setting ability. It is finally preferable that the degree of polymerization is in the range of 200 to 3500, more preferably 300 to 2500.

Moreover, in order to produce a corrugated board at high production speed without heating after applying the adhesive of 60° to 95° C., it has been found out that PVA concentration in the solution excluding solid other than PVA from adhesive to degree of polymerization of PVA is considerably important. That is, within the degree of polymerization of 200 to 3500, PVA having relative low degree of polymerization is available in wide range of PVA concentration. However, when PVA concentration of the adhesive is excessively high, the adhesive has remarkably high water retention and a decreased green bond. On the other hand, when PVA concentration is excessively low, the tack of adhesive and initial setting ability becomes worse and final adhesion strength becomes lower. In order to maintain the quality of the corrugated board, the PVA concentration must be relatively high.

Contrarily, when the degree of polymerization is relatively high, viscosity of PVA solution itself becomes high. Then, higher PVA concentration induces extremely high viscosity of adhesive, high water retention and less initial setting ability. Therefore, it is required that the PVA concentration is relatively low. However, when the PVA concentration becomes excessively low, tack of adhesive is insufficient and initial setting ability is inferior.

PVA having a relative high degree of polymerization is available in a narrow range of the PVA concentration in the adhesive. Such PVA tends to be required that the PVA concentration must be lower than that of PVA having low degree of polymerization to decrease the viscosity of adhesive and the solid content of adhesive must be maintained within a somewhat high range by a high content of clay. However, when the adhesive has an excessively high content of clay and an excessively low content of PVA, it naturally induces a remarkably low final adhesion strength.

Thus, it has been found out that PVA concentration to degree of polymerization of PVA must be in a very limited range in order to produce corrugated board at high production speed without heating after application of adhesive of which the temperature is 60° to 95° C. As the results of an intensive study, it has been found out that the adhesive having the following formulas (i), (ii) and (iii) is preferable.

$$Y \geq -0.0014 X + 9.4 \quad \text{(i)}$$

$$Y \leq -0.0061 X + 26.3 \quad \text{(ii)}$$

$$200 \leq X \leq 3500 \quad \text{(iii)}$$

wherein Y is a PVA concentration in aqueous solution excluding the solid other than PVA from adhesive defined as follows:

$$Y = \frac{P}{P + W} \times 100 \, (\% \text{ by weight})$$

P=Polyvinyl alcohol content in the adhesive (by weight)
W=Water content in the adhesive (by weight).
and X is degree of polymerization (viscosity-average degree of polymerization defined in JIS K 6726).

Figure 1:
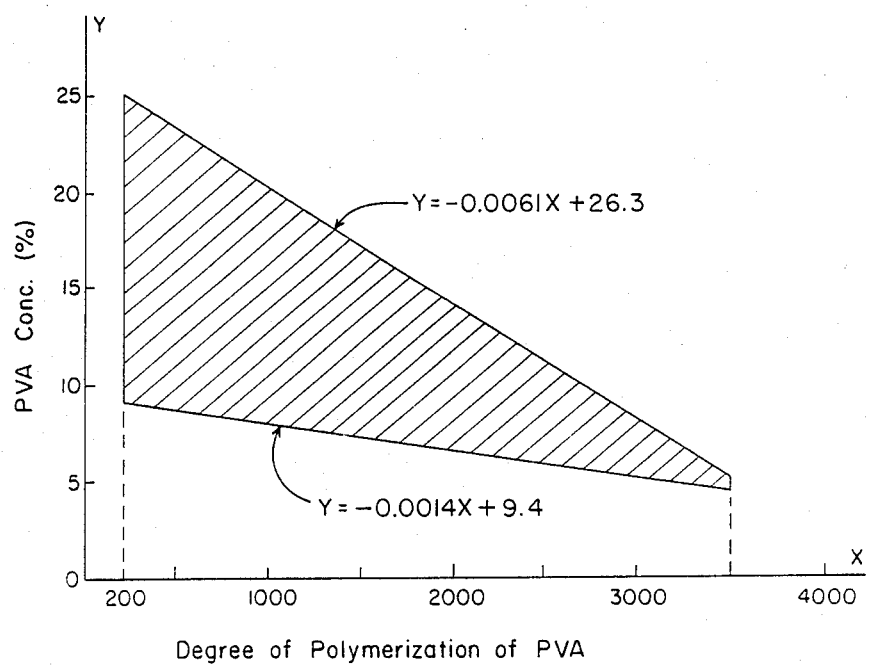
FIG. 1 shows the relationship between the degree of polymerization and the PVA concentration in the solution excluding solid other than PVA from an adhesive used in the present invention, wherein X represents degree of polymerization of PVA and Y represents the concentration of PVA as defined by following formula.

That is, the area with a oblique line in FIG. 1 shows a suitable area.

Then, although the degree of hydrolysis of PVA is not limited specifically, it is preferably in the range of not less than 70 mol %, more preferably, not less than 80 mol %. The degree of hydrolysis of PVA is measured by the method defined in JIS K 6726.

There can be used various kinds of PVA such as anion modified PVA, cation modified PVA, acrylamide modified PVA, lactone modified PVA, other various modified PVA produced by copolymerization, after-modified PVA (e.g. acetal modified PVA and the like), and modified PVA by other method in combination with the above non-modified PVA. Such modified PVA can be used alone or in combination of two or more.

The clay used in the prsent invention is one or more clay selected from the group consisting of kaolinite, halloysite, pyrophyllite and cericite. The clay has preferably an average particle size of not more than 2 μm for an excellent initial setting ability. However, if viscosity of an aqueous slurry being prepared by adding the clay into the water is very high, such clay has less processability, and can not give a relative high solid content of adhesive and a less improved green bond. It is preferable that the viscosity of aqueous slurry containing the clay by a Brookfield viscometer is not more than 1000 centipoises (25° C.) in 25 to 40% of an aqueous dispersion, when the clay is used alone or in combination with one or more clay selected from the group consisting of anionic polymer and metal salts thereof, soluble glass, metal salt of phosphorous compound, and nonion surfactant.

By the way, when the corrugated medium to which adhesive has been applied is adhered to the linerboard, the adhering mechanism is as follows. The water of the adhesive is absorbed by corrugated medium and linerboard. As a result, adhesive is concentrated and tackified. This mechanism mainly contributes to the initial setting ability and green bond of the adhesive in this invention. Further, the viscosity of adhesive also has a considerable effect upon the green bond, so that it is better than the viscosity of adhesive is higher. On the other hand, as to final adhesion strength, it is deemed that impregnation of the adhesive into the considerable depth of the paper layer of corrugated medium and linerboard is required so that the adhesive has preferably a lower viscosity.

As mentioned above, in order to produce a corrugated board, it is required for sufficient adhesion strength to be obtained within only several seconds between adhesive application to single-faced board and slitting and scoring. Then, although remarkably excellent green bond is the most desired characteristic for adhesion of corrugated board, it is also required that the adhesive has a high final adhesion strength for securing the desired strength for final products.

Then, as mentioned above, not only the value of the viscosity of adhesive is essential, but the adhesive temperature at application stage is essential. That is, when the temperature of adhesive is low at application stage, there can not be satisfied both green bond and final adhesion strength at the same time.

As the results of our various studies with respect to the temperature of applied adhesive, it has been found out that when applied adhesion temperature is 60° to 95° C., both green bond and final adhesion strength are satisfied at the same time. That is, when the temperature of applied adhesive of the present invention is less than 60° C., there can not be satisfied both the green bond and final adhesion strength at the same time and there can be produced no corrugated board at a high production speed, even though the viscosity of adhesive is high.

When the temperature of the adhesive at the application stage is not less than 60° C., there can be obtained sufficient green bond even at a high production speed of not less than 140 m/min. There can be also obtained a corrugated board having sufficient final adhesion strength. The higher the temperature is at application stage, the bettern the adhesion is. On the other hand, too high temperature induces an excessive evaporation of water from the adhesive, which makes the control of the concentration of adhesive difficult, and gives film to the surface of the adhesive together with less machinability. As the results, the upper limit of adhesive temperature at application stage is 95° C. It is finally preferable that the temperature of adhesive at the application stage is in the range of 60° to 95° C., more preferably 70° to 90° C.

The initial setting ability and green bond of the adhesive in the present invention is improved extremely because by increasing the temperature of said adhesive the surface energy of said adhesive is reduced, the water of said adhesive is penetrated easily to the corrugated medium and linerboard, and tack and concentration of said adhesive are increased rapidly.

The solid content of adhesive used in the present invention seems to affect the adhesion significantly, and higher solid content of the adhesive brings a greater green bond if the water retention of adhesive is not excessively high.

If the adhesive gelatinizes by decreasing of adhesive temperature until about the room temperature, it induces less processability of the adhesive during conveying through a pipe, storage or the like. Further, is also induces a defect of less adhesion because when in low production speed, the adhesive applied onto a single faced corrugated board has long open time, especially in a double facer part, so that the temperature of applied adhesive is decreased. Then, the adhesive gelatinizes or the viscosity of the adhesive is extremely increased before the contact to a liner to be laminated.

Therefore, such defect is not induced by the viscosity of the adhesive which is increased in the range of 1.5 to 8 times when the temperature of adhesive is dropped from 85° to 30° C.

In order to adjust the increasing of the viscosity of the adhesive in the range of 1.5 to 8 times when the temperature of adhesive is dropped from 85° to 30° C., it is preferably to use one or more aforementioned clay selected from the group consisting of kaolinite, halloysite, pyrophyllite and cericite. As mentioned below, when a water-soluble boron compound is used, the ratio of increase of the viscosity of the adhesive can be adjusted in the range of 1.5 to 8 times under the specific conditions such as using of the aforementioned specific clays, operation in neutral to acidic condition, and the like. An adhesive, which contains a PVA and considerable amount of gelatinizing agents such as Congo red, resorcinol or the like, or contains a PVA, considerable amount of water-soluble boron compound and an alkali filler, can not adjust the rate of increase of viscosity within the range of 1.5 to 8 times.

Moreover, at present a corrugating machine is operated at a high production speed of 100 m/min or more, and the control of application amount of adhesive in a glue machine is carried out under a considerable high shear rate of not less than $1 \times 10^4 \sec^{-1}$ so that the fluid characteristics of adhesive under high shear rate seem to affect the adhesion significantly.

As the results of our studies, it has been found out that the viscosity (A) at 60° to 95° C. of the adhesive by a Hercules viscometer under the shear rate of $3 \times 10^4 \sec^{-1}$ and the viscosity (B) at the same temperature by a Brookfield viscometer have a relation of the following formula (iv)

$$A/\sqrt{B} \leq 6.3 \qquad \text{(iv)}$$

and the viscosity of the adhesive by a Brookfield viscometer is in the range of 300 to 3000 centipoises at 85° C. Although there is no lower limit of $A/\sqrt{B}$, it is usually not less than 1. This relation is shown in FIG. 2, which illustrates that adhesion of adhesive having less ratio (formula iv) of the viscosity under high shear rate to that under lower shear rate is greater than that of adhesive having a higher ratio.

In this connection, Japanese Patent Laid Open Publication No. 3336/1972 exemplifies an adhesive showing pseudoplasticity under a shear rate of $1 \times 10^2$ to $1 \times 10^4$ $\sec^{-1}$, which relates to specific PVA (the viscosity of 4% aqueous solution is in the range of 9 to 16 centipoises) at a temperature of not more than 50° C.

On the other hand, the present invention relates to the adhesive employing PVA having a wide range of degree of polymerization of 200–3,500. Further, with respect to the viscosity measured by a Brookfield viscometer at 85° C. being 300–3,000 centipoises, it has been found that the adhesives, which have the ratio of viscosity at a high shear rate of $3 \times 10^4 \sec^{-1}$ (Hercules viscosity) against the square root of the viscosity measured at a low shear rate being lower than the specific value, are especially excellent as the adhesives for the production of the corrugated board. Furthermore, we have found that the adhesive temperature of application stage, as mentioned above, considerably affects initial setting ability. That is, when the temperature is not higher than 50° C., the initial setting ability at a high production speed is bad. It has been also found that the adhesives, which have a lower ratio of Hercules viscosity at a high shear rate against the viscosity at a low shear rate with the increasing of the temperature, are excellent in adhesion property.

As illustrated above, the water-base adhesive containing PVA and clay as main ingredients can be used for production of a corrugated board in a heat-saving and high-speed production, however, water-soluble boron compound can be also used in combination with PVA and clay.

As the water-soluble boron compound, boric acid, borate such as borax, and borate ester of polyhydric alcohol such as glycerol and ethylene glycol can be used, and among them boric acid is suitable.

It is preferable to use the water-soluble boron compound in an amount of not more than 15 parts, based on 100 parts of PVA. The lower bound is not specially limited, however, it is desirably to use in an amount of not less than 0.1 parts. The more used, the better green bond is provided because of increased tackiness of adhesives. In this case, however, it is not desirable that the adhesives tend to be gelatinized at a low temperature. Moreover, by decreasing of the adhesive temperature from 85° to 30° C., the ratio of increase of the viscosity becomes more than 8 times to induce a worse processability. It is more preferable to use a relatively greater amount of water-soluble boron compound against the PVA having a low degree of polymerization. On the other hand, it is preferable to use less amount of such compound against the PVA having a high degree of polymerization. It is preferable that the viscosity of the solution, excluding solid other than PVA and water-soluble boron compound from the adhesive, measured at 60°–95° C. by a Brookfield viscometer is in the range of 100–1,000 centipoises. The addition of the following peroxide into the adhesives improves the adhesion, however, in this case the viscosity is decreased. Therefore, the viscosity of the solution, excluding solid other than PVA and water-soluble boron compound from the adhesive, measured at 60°–95° C. by Brookfield viscometer is suitably in the range of 150–1,500 centipoises.

When the relatively greater amount of water-soluble boron compound is used, attention should be paid to the pH of the adhesive. That is, when the adhesive is alkaline, the bonding of PVA with water-soluble boron compound is facilitated and the adhesive is easily gelatinized at a low temperature. Then, the ratio of increase of viscosity can not be in the range of 1.5–8 times, when the temperature of adhesive is dropped from 85° to 30° C., which results in less handling of adhesives and less improved adhesion. Therefore, pH of the adhesives is preferably in the region from neutral to acidic conditions, preferably not higher than 6.

The adhesives for the production of a corrugated board having such properties may include those containing only PVA and clay, or PVA, clay and water-soluble boron compound. In order to improve its fluidity and adhesion property, however, it is more preferably to add to them metallic salt of phosphoric acid compound, such as sodium polyphosphate, sodium hexamethaphosphate and the like, dispersing agent for clay such as water glass and the like; anionic polymeric compound and metallic salt thereof such as polyacrylic acid and a salt thereof, sodium alginate, isobutene-maleic anhydride copolymer; nonionic surface active agent such as higher alcohol added with ethylene oxide, copolymer of ethylene oxide and propylene oxide and the like; or guar gum. Among the above said fluid additives, sodium hexamethaphosphate, sodium polyacrylate or sodium alginate is preferred. It is preferably added to the adhesive in an amount of 0.01–2 parts, based on 100 parts of clay. When more than 2 parts, the initial setting ability becomes bad. On the other hand, when less than 0.01 parts, there can be found no effect.

Moreover, it is effective for improvement of adhesion property to add peroxides such as sodium periodate, periodic acid, potassium periodate, sodium persulfate, potassium persulfate, ammonium persulfate and the like. Among them, periodic acid, sodium periodate and sodium persulfate are preferable. The addition of peroxide will decrease the viscosity to facilitate handling and also improve tackiness of adhesives as well as initial setting ability. However, incorporation of excessive amount of peroxide excessively decreases the viscosity and the initial setting ability becomes bad. Therefore, it is preferably to incorporate in an amount of 0.01–10 parts of peroxide based on 100 parts of PVA. Addition of peroxide of less than 0.01 parts may induce little effective.

Further, the addition of saccharose, colloidal silica, calcium carbonate, carbon black, white carbon or silica anhydride improves tackiness and adhesion property. It is preferable to incorporate in an amount of 0.1–20 parts, based on 100 parts of clay, more preferably 0.5–15 parts. The amount of less than 0.1 parts induces less effectiveness, and amount of more than 20 parts induces an adverse effect on fluidity, and such amount cannot be used. Even if the addition of large amount of white carbon or calcium carbonate results in bad adhesion, the addition of a small amount of clay improves adhesion property.

As mentioned above, it is preferably that the degree of polymerization of PVA is 200–3,500, more preferably 300–2,500. It is preferable that degree of hydrolysis of PVA is not less than 70 mol %, more preferably not less than 80 mol %. The PVA can be used in combination with one or more grades thereof. As the results of investigations about combination of various PVA grades, it has been found that the adhesion having a specific combination of more than two grades of PVA shows a further improved adhesion property compared to that of adhesion employing only one grade of PVA, even if they have the same average degree of polymerization degree and the same average degree of hydrolysis.

That is, regarding the degree of polymerization, the mixed PVA which contains 10–90 parts of PVA having the degree of polymerization of 200–800, preferably 300–600, and 90–10 parts of PVA having degree of polymerization of 1,100–3,500, preferably 1300–3500, more preferably 1,700 –2,500 shows further improved adhesion property compared to that obtained from only one grade of PVA having the same average degree of polymerization (said PVA is polymerized to be adjusted to the desired degree of polymerization and hydrolysis per se), while both of mixed PVA and one grade of PVA have almost the same viscosity. When either PVA having degree of polymerization of 200–800 or PVA having degree of polymerization of 1100–3500 is used in an amount of less than 10 parts based on 100 parts of the whole amount of PVA, the adhesive shows no different adhesion property from that obtained by using of only one grade of PVA. Although the reason is not clear, it seems that the degree of polymerization of mixed PVA consisting of two or more grades of PVA having different degrees of polymerization is widely distributed compared with that of only one grade of PVA. That is, the mixed PVA has a PVA having relatively lower degree of polymerization and a PVA having relatively higher degree of polymerization compared to the only one grade of PVA, even if they have the same average degree of the polymerization. In the adhesive containing such mixed PVA, PVA having relatively lower degree of polymerization facilitates the penetration of an adhesive solution into paper layer and improves adhesive property because clay is well dispersed by that PVA, while PVA having relatively higher degree of polymerization contributes to improve tackiness which significantly affect a green bond of the adhesive.

As to degree of hydrolysis, it has been found out that the adhesive containing mixed PVA which consisting of 10–90 parts of PVA (a) having degree of hydrolysis of 72–100 mol % and 90–10 parts of PVA (b) having degree of hydrolysis lower by 2–30 mol % than that of PVA (a) is superior in adhesion property to the adhesive containing the PVA which consists of only one grade of PVA (PVA prepared to be adjusted to desired degree of hydrolysis per se) having the same degree of hydrolysis.

Although the reason for further improvement of adhesion property is not clear, it seems that the degree of hydrolysis of mixed PVA consisting of two or more grades of PVA having different degrees of hydrolysis is widely distributed compared with that of only one grade of PVA. That is, the mixed PVA has a PVA having relatively lower degree of hydrolysis and a PVA having relatively higher degree of hydrolysis compared with that of the only one grade of PVA, even if they have the same average degree of hydrolysis. Generally, PVA having relatively lower degree of hydrolysis shows relatively lower surface energy when dissolved in water and can easily penetrate into the paper layer, while PVA having relatively higher degree of hydrolysis contributes to the green bond owing to its excellent wet tack of the adhesive containing that PVA, so that adhesive containing such mixed PVA is improved in both green bond strength and final adhesion strength. However, it should be noted that the adhesive containing the PVA which contains greater amount of PVA having higher degree of hydrolysis and higher degree of polymerization shows higher viscosity, so that said adhesive may hardly be adjusted to high solid content. While, it should be noted that the adhesive containing the PVA which contains greater amount of PVA having lower degree of hydrolysis and lower degree of polymerization especially shows less wet tack.

When using more than two grades of PVA, there may be many possibilities for the combination of PVA having different degrees of polymerization and/or hydrolysis, such as a combination of more than two grades of PVA having the same degree of polymerization but different degree of hydrolysis, a combination of those having the same degree of hydrolysis but different degree of polymerization, a combination of PVA having lower degree of polymerization and higher degree of hydrolysis with PVA having higher degree of polymerization and lower degree of hydrolysis, and vice versa. The adhesive employing the PVA of above combination in certain ratio shows an further improved adhesion property compared with those employing only one grade of PVA. Among them, the adhesive containing the combination of PVA which comprises completely hydrolyzed PVA having lower degree of polymerization and partially hydrolyzed PVA having higher degree of polymerization, and containing boric acid shows a remarkably excellent adhesion property. Although the PVA which is hydrolyzed in the conventional methanol solution is effective, PVA which is hydrolyzed in methyl acetate or other solvent, or the mixture of methanol and other solvent can be also used.

The adhesives in the present invention can be used for paper, such as laminating paper; board and corrugated board, paper tube, paper bag and the like, in addition to a corrugated board application. In the above usage, it is not necessary to conduct an adhesion in a short time as that for a corrugated board. However, recently, an improvement in initial setting ability has been required with the increasing of production speed. Therefore, the present invention can employ advantageously such a high production speed.

In order to prepare the present adhesive, the mixture of PVA, clay, water-soluble boron compound or other additives previously prepared may be firstly poured into water with stirring to prepare a slurry, or a metallic salt of phosphoric acid compound, dispersant for clay such as water-glass, additives such as anionic polymeric compound and a metallic salt thereof and nonionic surface-active agent, clay, PVA, water-soluble boron compound or other additives may be poured into water one after another with stirring to prepare slurry. The process for preparing the adhesive may be conducted whether in a batch process or in a continuous process, and it may be prepared by heating and dissolving by any heating process which comprises, for example directly blowing a steam vapor into the slurry solution in a jet-cooker or a preparation bath, or indirectly heating a preparation bath or pipe.

Peroxide may be added either before heating and dissolving, or after heating at high temperature. However, it is preferably to add it into the slurry solution just before heating for efficiency.

In the process having an excellent effect on heat energy saving and can be manufactured at high production speed of a corrugated board of the present invention, the production can be carried out by pre-heating of linerboard or single faced corrugated boards, or by heating of heat tables.

According to the process for production of a corrugated board of the present invention, it becomes possible to produce at high speed of 100 m/min or more, and if desired, 120 m/min or more. It is also possible to produce at a remarkably high speed of up to 140 m/min.

The process for production of a corrugated board of the present invention has a great advantage that it can produce corrugated board at a wide range of production speed, from low to high, without heating after application of the adhesive and laminating, and it also has an excellent effect on heat energy saving.

Moreover, the process for production of a corrugated board of the present invention has a great effect to reduce warpage of the corrugated board sheets.

The present invention is further illustrated by the following table tests and examples in detail but should not be construed to be limited thereto.

A. PVA and clay used are as follows:
(1) PVA

| No. | Degree of Polymerization | Degree of Hydrolysis (mol %) | |
|-----|--------------------------|------------------------------|---|
| A | 550 | 98.6 | (Kuraray Poval PVA-105) |
| B | 700 | 98.3 | |
| C | 1,100 | 98.7 | (Kuraray Poval PVA-110) |
| D | 1,750 | 98.5 | (Kuraray Poval PVA-117) |
| E | 1,750 | 88.5 | (Kuraray Poval PVA-217) |
| F | 2,450 | 98.5 | (Kuraray Poval PVA-124) |
| G | 1,500 | 98.2 | |
| H | 330 | 98.6 | |
| I | 550 | 88.4 | (Kuraray Poval PVA-205) |
| J | 2,450 | 95.2 | (Kuraray Poval PVA-624) |
| K | 1,750 | 96.1 | (Kuraray Poval PVA-CST) |
| L | 1,300 | 93.6 | (Kuraray Poval PVA-613) |
| M | 2,450 | 88.2 | (Kuraray Poval PVA-224) |
| N | 3,300 | 88.3 | |

(2) Clay
I: UG-90 (ENGELHARD): Average Particle Size, 0.3 μm, Kaolinite
II: ASP-400 (ENGELHARD): Average Particle Size, 4.8 μm, Kaolinite
III: KANATANI-CLAY NSF (KANATANI KOGYO) Particle Size less than 2 μm, 99%, Halloysite:

B. Evaluation of green bond and initial setting ability, evaluation of suitability for laminating at a high or low production speed, measurement of adhesive strength, viscosity were carried out as follows:

(1) Evaluation of green bond and initial setting ability according to table test An applicator roll controlled by a given temperature was rotated in an adhesive controlled at a given temperature. The amount of adhesives on roll was controlled with a doctor blade, thereafter flute tips of the single faced corrugated board was lightly pressed onto the roller to apply adhesive thereon. Then, immediately, it was laminated to a liner, and thereafter pinched lightly for 3–10 seconds. Then, the resulting products were subjected to forced peeling test and the condition of adhesion was observed (⊚: Excellent, ○: Good, △: Not Bad, x: bad, xx: Very Bad). As single faced corrugated board and linerboard, 220 g/m² of JIS B-Grade linerboard and 125 g/m² of JIS B-Grade corrugating medium were used, respectively.

(2) Evaluation with Corrugator

The corrugator used is 1600 mm wide and has a maximum speed of 140 m/min. The conventional heating on the double facer was not carried out. A linerboard (JIS B-Grade; 220 g/m²) and a corrugating medium (JIS B-Grade; 125 g/m²) were mainly used.

The adhesive of the present invention, which was prepared as mentioned above, was supplied to a glue machine of which the glue unit was held to 60°–95° C., was transferred and applied onto flute tips of a single faced corrugated board with an application roll to adhere said single-faced board with linerboard. The resulting corrugated board was passed through slitter-scorer with corrugator to slit and score, and further rotary cutoff and was cut on a rotary cutoff.

(a) Evaluation of adhesive suitability for production at a high speed with a corrugator Adhesive suitability was evaluated by Highest Combining Speed representing the highest speed that corrugated board is combined at without any adhesion failure in slit and/or scored parts of the corrugated blank. For finding Highest Combining Speed, corrugated board made on the corrugator was immediately delaminated at the end of a rotary cutoff, and was checked whether there was said adhesion failure.

(b) Evaluation of adhesive suitability for production at a low speed with a corrugator The corrugator was operated at the lowest speed of 25 m/min and the adhering condition was examined at the end of a rotary cutoff on the corrugator. Low Speed Evaluation means the evaluation of adhering condition of corrugated board manufactured at 25 m/min.

(3) Method for adhesive strength

Adhesive strength was measured with single adhesion separating test specified in JIS Z-0402.

(4) Measurement of Viscosity (a) Brookfield viscosity (centipoise)

Brookfield viscometer, No. 1–No. 4 rotor, 30–60 rpm.

(b) Viscosity under high shear rate (centipoise)

Hercules high speed viscometer (produced by KUMAGAI RIKI KOGYO CO., LTD.)

Bob B; highest rotating speed, 8800 rpm; sweep time 10 sec.; Hercules viscosity ($\eta$) is defined by the following equation:

$$\eta = \frac{955 \times T \times S}{N} \text{ (centipoise)}$$

T: torque (dyne:cm)
S: shape factor = 0.0004
N: rotation = 7,200 rpm (shear rate; $3 \times 10^4$ sec$^{-1}$)

The terms "Parts" and "%" used herein mean parts by weight and weight %, respectively.

EXAMPLES 1 TO 29

The mixtures having the formula shown in Table 1 were heated and stirred for one hour and dissolved to prepare adhesive. The green bond and initial setting ability and the result of the adhesive evaluation test with a corrugator of these adhesives are shown in Table 2. In the adhesive evaluation test, "A" flute was used and the application amount represents the amount of solid content of an adhesive applied onto single-face side of corrugated board.

As is clear from Examples 1–29, it has been found that an excellent adhesion can be obtained by applying said 60°–95° C. adhesive having a ratio of PVA concentration against polymerization degree thereof within an area shown by an oblique line of the FIG. 1, and having a solid content of 25–60% and a viscosity being within a range of 200 to 6,000 centipoise at 85° C., and the viscosity of the adhesive being increased not more than 8 times when the adhesive is cooled from 85° C. to 30° C.

As is clear from Comparative Example 2, an adhesive having excessively high viscosity at 85° C. has a inferior adhesion. As is clear from Comparative Example 6, an adhesive easily to be gelatinized is inferior in laminating ability at a low production speed. Further, the temperature of the adhesive at the application stage gives a great effect on green bond, initial setting ability and suitability for combining at a high production speed. That is, the temperature not lower than 60° C. is suitable (see Examples 1–29), and when the temperature of adhesive at application stage is below 60° C. (see Comparative Examples 3 and 4), the green bond and initial setting ability and suitability for combining at a high production speed were insufficient.

As is clear from Examples 7–29, the adhesives, which have a viscosity of an aqueous PVA-boric acid solution at temperature of 60°–95° C. in a range of 100 to 1,500 centipoises, shows a good adhesion property.

As is clear from Examples 10–20, the adhesion is further improved by adding anionic polymer compound, phosphoric acid compound, peroxide, colloidal silica (Snowtex C, NISSAN CHEMICAL CO., LTD.), white carbon (Silton R-2, Mizusawa Kagaku kk), Carbon black (#44, Mitsubishi Kasei KK), calcium carbonate, silica anhydride (AEROSIL 380, AEROSIL NIPPON) or guar gum (MAYPROGUM SN-20, SANSHO KK).

In Example 19, an adhesive is prepared in the same manner and compounding ratio as described in Example 10 except that the mixture of PVA (A) and (F) was substituted for PVA (C), wherein an average degree of polymerization of the PVA mixture was adjusted to be the same as that of PVA (C). The adhesive of Example 19 shows almost the same viscosity as that of example 10, but it also shows a further improved adhesion. Example 21 or 23 contained one grade of PVA (K) or PVA (L) respectively, and Example 22 contained two grades of PVA (D) and (E).

An average degree of polymerization and an average degree of hydrolysis of mixed PVA which comprises PVA (D) and (E) are nearly equal to those of PVA (K). Example 24 comprises three grades of PVA (A), (I) and (M). Example 25 comprises three grades of PVA (A), (I) and (F). An average degree of polymerization and an average degree of hydrolysis of mixed PVA which comprises PVA (A), (I) and (M), or PVA (A), (I) and (F), are nearly equal to those of PVA (L).

In the comparison of example 21 with 22, or 23 with 24 and 25, it has been found that the adhesive comprising two grades of PVA or more shows a further improved adhesion compared to that of one grade of PVA. Further, in the comparison of examples 24 and 25, it is obvious that adhesive of example 24 using completely hydrolyzed PVA having low degree of polymerization and partially hydrolyzed PVA having high degree of polymerization, shows a better adhesion property. As is obvious from Examples 24, 25, 26, 27, and 29, each adhesive, which contains two grades or more of PVA having different degrees of polymerization and hydrolysis in a specified ratio, shows a remarkably excellent adhesion property.

The viscosity of 40% slurry solution of clay (I) at 25° C. measured with Brookfield viscometer was 10 centipoises and that of 32% slurry solution of clay (III) was 800 centipoises.

TABLE 1

| No. | | PVA (1) | | PVA (2) | | PVA (3) | Clay | | Boric Acid | Additives | Water | Solid Conc (%) | PVA* Conc (%) |
|---|---|---|---|---|---|---|---|---|---|---|---|---|---|
| Ex | | | | | | | | | | | | | |
| 1 | A | 14.6 | | | | | III | 29.4 | — | — | — | 56.0 | 44.0 | 22.6 |
| 2 | D | 11.7 | | | | | III | 23.4 | — | — | — | 64.9 | 35.1 | 15.3 |
| 3 | F | 6.0 | | | | | III | 24.1 | — | — | — | 69.9 | 30.1 | 7.9 |
| 4 | H | 12.3 | | | | | III | 36.6 | 0.64 | — | — | 50.5 | 49.5 | 19.6 |
| 5 | F | 8.3 | | | | | I | 22.5 | 0.42 | — | — | 68.8 | 31.2 | 10.8 |
| 6 | A | 5.9 | | | | | I | 32.7 | 0.87 | — | — | 60.5 | 39.5 | 8.9 |
| 7 | F | 4.7 | | | | | III | 26.0 | 0.16 | — | — | 69.2 | 30.8 | 6.4 |
| 8 | D | 5.6 | | | | | I | 25.8 | 0.54 | — | — | 68.0 | 32.0 | 7.6 |
| 9 | E | 7.8 | | | | | I | 21.8 | 0.70 | — | — | 69.2 | 31.0 | 10.2 |
| 10 | C | 8.6 | | | | | I | 25.2 | 0.60 | Sodium Polyacrylate | 0.1 | 65.5 | 34.5 | 11.6 |
| 11 | D | 6.1 | | | | | I | 23.3 | 0.90 | Sodium Alginate Sodium Periodate | 0.1 0.2 | 69.4 | 30.6 | 8.1 |
| 12 | D | 7.7 | | | | | I | 22.1 | 0.80 | Sodium Persulfate | 0.2 | 69.3 | 30.7 | 10.0 |
| 13 | G | 8.1 | | | | | III | 23.2 | 0.80 | Sodium Hexametha-phosphate | 0.4 | 67.5 | 32.5 | 10.7 |
| 14 | D | 5.6 | | | | | I | 24.8 | 0.54 | Colloidal Silica | 1.0 | 68.0 | 32.0 | 7.6 |
| 15 | D | 5.6 | | | | | I | 24.8 | 0.54 | Carbon Black | 1.0 | 68.0 | 32.0 | 7.6 |
| 16 | D | 5.6 | | | | | I | 24.8 | 0.54 | White Carbon | 1.0 | 68.0 | 32.0 | 7.6 |
| 17 | D | 5.6 | | | | | I | 24.8 | 0.54 | Calcium Carbonate | 1.0 | 68.0 | 32.0 | 7.6 |
| 18 | D | 5.6 | | | | | I | 24.8 | 0.54 | Silica Anhydride | 1.0 | 68.0 | 32.0 | 7.6 |
| 19 | A | 3.9 | F | 1.7 | | | I | 25.2 | 0.60 | Sodium Polyacrylate | 0.1 | 65.5 | 34.5 | 11.6 |
| 20 | A | 3.9 | F | 1.7 | | | I | 25.2 | 0.60 | Guar Gum | 0.1 | 65.5 | 34.5 | 11.6 |
| 21 | K | 8.1 | | | | | I | 18.2 | 0.65 | — | — | 73.1 | 26.9 | 10.0 |
| 22 | D | 6.2 | E | 1.9 | | | I | 18.2 | 0.65 | — | — | 73.1 | 26.9 | 10.0 |
| 23 | L | 9.5 | | | | | I | 21.4 | 0.76 | — | — | 68.4 | 31.6 | 12.2 |
| 24 | A | 4.8 | I | 0.8 | M | 3.9 | I | 21.4 | 0.76 | — | — | 68.4 | 31.6 | 12.2 |
| 25 | A | 0.9 | I | 4.7 | F | 3.9 | I | 21.4 | 0.76 | — | — | 68.4 | 31.6 | 12.2 |
| 26 | A | 9.5 | N | 1.1 | | | I | 23.9 | 0.85 | — | — | 64.7 | 35.3 | 14.1 |
| 27 | H | 0.76 | D | 6.7 | | | I | 21.0 | 0.67 | — | — | 70.8 | 29.2 | 9.6 |
| 28 | H | 0.37 | D | 6.9 | | | I | 20.3 | 0.65 | — | — | 71.8 | 28.2 | 9.2 |
| 29 | A | 5.6 | J | 3.7 | | | I | 20.9 | 0.74 | — | — | 69.1 | 30.9 | 11.9 |
| Comp. Ex | | | | | | | | | | | | | | |
| 1 | B | 6.2 | | | | | III | 26.7 | 0.19 | — | — | 72.0 | 28.0 | 7.9 |
| 2 | D | 11.8 | | | | | III | 26.7 | 0.19 | — | — | 61.3 | 38.7 | 16.1 |
| 3 | F | 4.7 | | | | | III | 26.0 | 0.16 | — | — | 69.2 | 30.8 | 6.4 |
| 4 | D | 7.7 | | | | | I | 22.1 | 0.80 | Sodium Persulfate | 0.2 | 69.3 | 30.7 | 10.0 |
| 5 | F | 3.7 | | | | | I | 20.6 | 0.37 | Sodium Polyacrylate | 0.12 | 75.2 | 24.8 | 4.7 |
| 6 | D | 5.9 | | | | | CaCO$_3$ | 13.6 | 0.16 | — | — | 80.4 | 19.6 | 6.8 |

*PVA concentration in the solution excluding solid other than PVA from adhesive.

cellent adhesion property.

TABLE 2

| | | Viscosity of Adhesive (cP) | | | Application Condition | | | | Adhesion | | | | |
| | | | | | Adhesive Temp. (°C.) | Viscosity of PVA-Boric Acid Solution (cp) | Viscosity of Adhesive (cp) | Appli-* cation Amount (g/m$^2$) | Table Test Green** Bond | Corrugator | | | |
| No. | | 85° C. (a) | 30° C. (b) | (b)/(a) | | | | | | Highest*** Combining Speed | Corruga-tion at Low**** Speed | Final Adhesion Strength ***** | ****** A/√B |
| Ex | | | | | | | | | | | | | |
| 1 | | 440 | 2,200 | 5.0 | 60 | — | 850 | 10.1 | O | 100 | Good | 20.1 | 6.5 |
| 2 | | 4,300 | 22,800 | 5.3 | 90 | — | 3,700 | 7.3 | O | 100 | Good | 21.2 | 6.7 |
| 3 | | 330 | 1,800 | 5.5 | 80 | — | 350 | 8.3 | O | 100 | Good | 20.8 | 6.8 |
| 4 | | 750 | 2,030 | 5.0 | 75 | 50 | 790 | 12.5 | O | 100 | Good | 20.3 | 6.6 |
| 5 | | 5,700 | 45,000 | 7.9 | 90 | 1,600 | 4,900 | 8.0 | O | 100 | Good | 20.1 | 7.1 |
| 6 | | 270 | 560 | 2.6 | 90 | 25 | 255 | 10.5 | O | 100 | Good | 20.2 | 6.6 |
| 7 | | 570 | 2,800 | 4.9 | 80 | 110 | 650 | 7.2 | O-⊚ | 120 | Good | 22.1 | 6.2 |

TABLE 2-continued

| | Viscosity of Adhesive (cP) | | | Application Condition | | | | Adhesion | | | | |
| | | | | Adhe-sive Temp. (°C.) | Viscosity of PVA-Boric Acid Solution (cp) | Viscosity of Adhesive (cp) | Appli-* cation Amount (g/m²) | Table Test Green** Bond | Corrugator | | | |
| No. | 85° C. (a) | 30° C. (b) | (b)/(a) | | | | | | Highest*** Combining Speed | Corrugation at Low**** Speed | Final Adhesion Strength ***** | ****** A/√B |
| --- | --- | --- | --- | --- | --- | --- | --- | --- | --- | --- | --- | --- |
| 8 | 390 | 3,040 | 7.8 | 70 | 200 | 640 | 6.3 | ○-◎ | 120 | Good | 20.5 | 6.1 |
| 9 | 2,000 | 7,400 | 3.7 | 95 | 630 | 1,700 | 7.5 | ○-◎ | 120 | Good | 21.8 | 5.8 |
| 10 | 460 | 3,350 | 7.3 | 80 | 150 | 540 | 7.0 | ◎ | >140 | Good | 20.5 | 5.7 |
| 11 | 420 | 2,340 | 5.6 | 70 | 800 | 640 | 7.2 | ◎ | >140 | Good | 22.3 | 5.5 |
| 12 | 1,600 | 5,200 | 3.3 | 75 | 1,300 | 1,900 | 6.5 | ◎ | >140 | Good | 21.8 | 5.5 |
| 13 | 1,010 | 3,960 | 3.9 | 85 | 370 | 1,010 | 6.5 | ◎ | >140 | Good | 22.3 | 5.8 |
| 14 | 430 | 3,210 | 7.5 | 70 | 200 | 700 | 6.5 | ◎ | >140 | Good | 20.4 | 6.2 |
| 15 | 410 | 3,100 | 7.6 | 70 | 200 | 670 | 6.4 | ◎ | >140 | Good | 20.7 | 6.1 |
| 16 | 400 | 3,080 | 7.7 | 70 | 200 | 660 | 6.4 | ◎ | >140 | Good | 20.3 | 6.1 |
| 17 | 440 | 3,380 | 7.7 | 70 | 200 | 750 | 6.5 | ◎ | >140 | Good | 20.2 | 6.1 |
| 18 | 400 | 3,100 | 7.8 | 70 | 200 | 670 | 6.4 | ◎ | >140 | Good | 20.5 | 6.1 |
| 19 | 450 | 3,300 | 7.3 | 70 | 155 | 740 | 7.4 | ◎ | >140 | Good | 21.2 | 5.7 |
| 20 | 470 | 3,400 | 7.2 | 70 | 155 | 760 | 7.4 | ◎ | >140 | Good | 21.3 | 5.7 |
| 21 | 1,020 | 5,960 | 5.8 | 75 | 610 | 1,340 | 8.5 | ○ | 110 | Good | 21.7 | 5.7 |
| 22 | 1,030 | 5,980 | 5.8 | 75 | 610 | 1,350 | 8.4 | ◎ | >140 | Good | 21.4 | 5.6 |
| 23 | 900 | 5,490 | 6.1 | 80 | 710 | 1,040 | 7.3 | ○ | 110 | Good | 20.9 | 5.8 |
| 24 | 880 | 5,420 | 6.2 | 80 | 700 | 1,030 | 7.4 | ◎ | >140 | Good | 21.2 | 5.7 |
| 25 | 890 | 5,450 | 6.1 | 80 | 700 | 1,040 | 7.3 | ○-◎ | 130 | Good | 20.5 | 5.7 |
| 26 | 540 | 2,950 | 5.5 | 65 | 120 | 950 | 8.0 | ◎ | >140 | Good | 20.4 | 6.2 |
| 27 | 740 | 3,950 | 5.3 | 90 | 210 | 650 | 7.5 | ◎ | >140 | Good | 21.3 | 6.2 |
| 28 | 800 | 4,150 | 5.2 | 90 | 160 | 700 | 7.5 | ○-◎ | 120 | Good | 21.5 | 6.2 |
| 29 | 1,020 | 5,970 | 5.9 | 70 | 600 | 1,570 | 7.0 | ◎ | >140 | Good | 20.5 | 5.7 |
| Comp Ex | | | | | | | | | | | | |
| 1 | 45 | 160 | 3.6 | 90 | 10 | 41 | 8.5 | xx | Cannot be Corrugated | Bad | — | |
| 2 | 8,500 | 48,500 | 5.7 | 90 | 5,400 | 7,500 | 10.5 | Δ | Cannot be Corrugated | Bad | — | |
| 3 | 570 | 2,800 | 4.9 | 40 | 350 | 2,000 | 6.0 | x | 30 | Good | 22.3 | |
| 4 | 1,600 | 5,200 | 3.3 | 50 | 2,800 | 3,200 | 6.5 | Δ | 60 | Good | 22.5 | |
| 5 | 63 | 270 | 4.3 | 85 | 38 | 63 | 6.8 | x | Cannot be Corrugated | Bad | — | |
| 6 | 450 | >60,000 | >100 | 85 | — | 450 | 6.5 | Δ | 80 | Bad | — | |

*Application amount of adhesive or one side of corrugating board (solid base)
**Green Bond and Initial Setting Ability.
***Corrugatable speed. Highest speed of corrugator is 140 m/min.
****Degree of adhesion at 25 m/min.
*****kg/40 cm²
******A: Hercules viscosity, B: Brookfield viscosity

EXAMPLE 30

25 Parts of PVA (D), 72.3 parts of clay (I), 2.5 parts of boric acid, and 0.2 parts of sodium alginate were dissolved into water to give an adhesive having a solid concentration of 27.8%. The viscosity of adhesive measured by Brookfield viscometer was 1,960 centipoises at 65° C. and 820 centipoises at 90° C. Hercules viscosity of the adhesive under high shear rate of $3 \times 10^4$ sec$^{-1}$ was 250 centipoises at 65° C. and 155 centipoises at 90° C. The ratio at the same temperature, (Hercules Viscosity)/√(Brookfield Viscosity), was 5.6 at 65° C. and 5.4 at 90° C. (see FIG. 2).

A adhesive evaluation test was carried out by using the adhesive of 65° C. The adhesive had a good green bond and a good combining ability at high production speed, and also had a high final adhesion strength value of 21.7 kg/40 cm² at an application amount of 6.0 g/m² (solid base).

EXAMPLE 31

24 Parts of PVA (D), 73.6 parts of clay (III), and 2.4 parts of boric acid were dissolved into water to give an adhesive having a solid concentration of 27.6%. The viscosity of adhesive measured by Brookfield viscometer was 1,550 centipoises at 65° C. and 360 centipoises at 90° C. Hercules viscosity of the adhesive under high shear rate of $3 \times 10^4$ sec$^{-1}$ was 280 centipoises at 65° C. and 145 centipoises at 90° C. The ratio at the same temperature, (Hercules Viscosity)/√(Brookfield Viscosity), was 7.1 at 65° C. and 7.6 at 90° C., that is, the ratio at 90° C. is higher than that at 65° C. (see FIG. 2).

An adhesive evaluation test was carried out at 65° C. by using the adhesive. Green bond and combining ability at high production speed of this adhesive is inferior to that of Example 30.

EXAMPLE 32

24 Parts of PVA (C), 73.2 parts of clay (I), 2.4 parts of boric acid, 0.1 parts of sodium polyacrylate and 0.3 parts of sodium persulfate were dissolved into water to give an adhesive having a solid concentration of 35.5%. The viscosity of the adhesive measured by a Brookfield viscometer was 850 centipoises at 90° C., while Hercules viscosity of the adhesive at high shear rate ($3 \times 10^4$ sec$^{-1}$) was 156 centipoises at 90° C. The adhesive had a ratio of 5.4, [(Hercules Viscosity)/√(Brookfield Viscosity) = 156/√850 ] (see FIG. 2).

A adhesive evaluation test was carried out at 90° C. by using the adhesive. The adhesive had a good green bond and a good suitability for combining at a production speed of not less than 140 m/min, and also had a high adhesion strength of 21.5 kg/40 cm² at an application amount of 6.5 g/m² (solid base).

EXAMPLE 33

24 Parts of PVA (B), 73.3 parts of UG-90 (average particle size: 0.3 μm), 2.4 parts of boric acid and 0.2 parts of sodium polyacrylate were dissolved into water to give an adhesive having a solid concentration of 37.0%. The viscosity by a Brookfield viscometer of the adhesive was 980 centipoises at 85° C. and 3,510 centipoises at 30° C. Further, the adhesive having a solid concentration of 42.4% prepared in the same manner as described above except that ASP-400 (average particle size: 4.8 μm) was used instead of the said UG-90 had a viscosity by a Brookfield viscometer of the adhesive of 1,000 centipoises at 85° C. and 4,300 centipoises at 30° C. In the comparison of the green bond of both adhesives, both adhesive had a good green bond, however, that of the adhesive using UG-90 was better.

Moreover, the adhesive using white carbon instead of clay had a bad green bond.

What is claimed is:

1. A process for production of corrugated board using an adhesive which comprises water, polyvinyl alcohol, clay and a water-soluble boron compound, the ratio of clay to polyvinyl alcohol being in a range of 200 to 600 parts by weight based on 100 parts by weight of polyvinyl alcohol, the ratio of the water-soluble boron compound being not more than 15 parts by weight based on 100 parts by weight of polyvinyl alcohol, the solid content of the adhesive being 25 to 60% by weight, characterized in that (a) a polyvinyl alcohol concentration in the solution excluding solid other than polyvinyl alcohol from the adhesive being in the region bounded by the following formulas:

$$Y \geq -0.0014 X + 9.4 \quad \text{(i)}$$

$$Y \leq -0.0061 X + 26.4 \quad \text{(ii)}$$

$$200 \leq X \leq 3500 \quad \text{(iii)}$$

wherein Y is defined by the following formula:

$$Y = \frac{P}{P + W} \times 100 \; (\% \text{ by weight})$$

P = Polyvinyl alcohol content in the adhesive (by weight)
W = Water content in the adhesive (by weight) and
X is degree of polymerization of the polyvinyl alcohol, (b) the viscosity of the adhesive measured by a Brookfield viscometer being from 200 to 6000 centipoises at 85° C., and the rate of increase of the viscosity of the adhesive being in the range of 1.5 to 8 times when the temperature of adhesive is dropped from 85° to 30° C., (c) the clay being one or more members selected from the group consisting of kaolinite, halloysite, pyrophyllite and cericite, and the pH of the adhesive being not more than 6, (d) the process comprising applying the adhesive, at a temperature of 60° to 95° C., onto the flute tips of corrugated medium, and utilizing the corrugated medium coated with the adhesive to produce a corrugated board.

2. A process for production of corrugated board according to claim 1, wherein a viscosity (A) of the adhesive at 60° to 95° C. measured by a Hercules viscometer under the shear rate of $3 \times 10^4$ sec$^{-1}$ and a viscosity (B) of the adhesive at the same temperature measured by a Brookfield viscometer have a relation of the following formula (iv)

$$1 \leq A/\sqrt{B} \leq 6.3 \quad \text{(iv)}$$

and the viscosity of the adhesive measured by a Brookfield viscometer being in the range of 300 to 3000 centipoises at 85° C.

3. A process for production of corrugated board according to claim 1, wherein the viscosity measured by a Brookfield viscometer of a solution excluding solid other than polyvinyl alcohol and water-soluble boron compound from the adhesive is 100 to 1500 centipoises at 60° to 95° C.

4. A process for production of corrugated board according to claim 1, wherein the clay has an average particle size of not more than 2 μm.

5. A process for production of corrugated board according to claim 1, wherein the viscosity of the adhesive measured by a Brookfield viscometer is from 300 to 4000 centipoises at 60° to 95° C.

6. A process for production of corrugated board according to claim 1, wherein the polyvinyl alcohol comprises 10 to 90 parts by weight of polyvinyl alcohol having a degree of polymerization of 200 to 800 and 90 to 10 parts by weight of polyvinyl alcohol having a degree of polymerization of 1100 to 3500.

7. A process for production of corrugated board according to claim 1, wherein the polyvinyl alcohol comprises 10 to 90 parts by weight of polyvinyl alcohol (a) having a degree of hydrolysis of 72 to 100 mol % and 90 to 10 parts by weight of polyvinyl alcohol having a degree of hydrolysis lower by 2 to 30 mol % than that of (a).

8. A process for production of corrugated board according to claim 1, wherein the adhesive further comprises at least one additive selected from the group consisting of a phosphorous compound, sodium polyacrylate, sodium alginate and guar gum, in an amount of 0.01 to 2 parts by weight to 100 parts by weight of clay.

9. A process for production of corrugated board according to claim 1, wherein peroxide is added to the adhesive in an amount of 0.01 to 10 parts by weight to 100 parts by weight of polyvinyl alcohol.

10. A process for production of corrugated board according to claim 1, wherein the adhesive further comprises at least one additive selected from the group consisting of saccharose, colloidal silica, calcium carbonate, carbon black, white carbon, and silica anhydride, in an amount of 0.1 to 20 parts by weight to 100 parts by weight of clay.

* * * * *

UNITED STATES PATENT AND TRADEMARK OFFICE
CERTIFICATE OF CORRECTION

PATENT NO.  :  4,824,696

DATED       :  April 25, 1989

INVENTOR(S) :  Masateru TOKUNO et al.

It is certified that error appears in the above-identified patent and that said Letters Patent is hereby corrected as shown below:

In the patent heading, change "Tokumo et al." to --Tokuno et al.--

[75] Inventors: change "Masateru Tokumo" to --Masateru Tokuno--

Claim 1, line 16, change "26.4" to --26.3--

Signed and Sealed this

Twenty-sixth Day of June, 1990

*Attest:*

HARRY F. MANBECK, JR.

*Attesting Officer*                    *Commissioner of Patents and Trademarks*